United States Patent Office 2,924,072
Patented Feb. 9, 1960

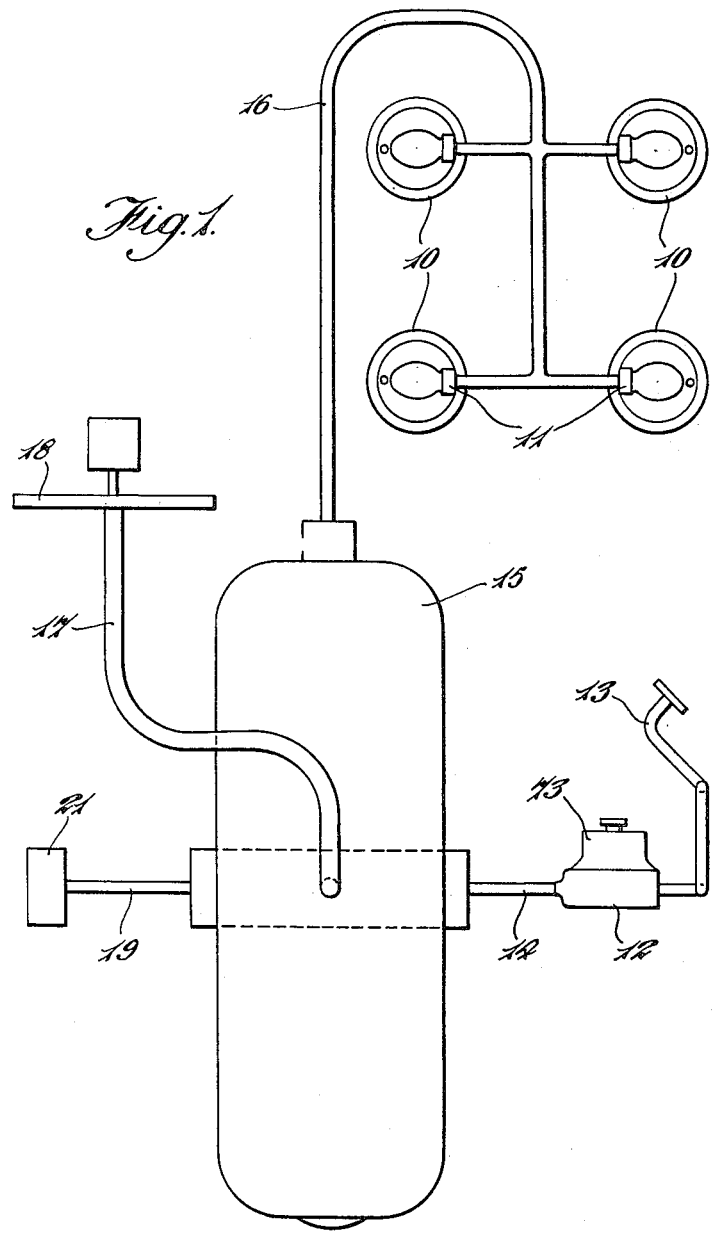

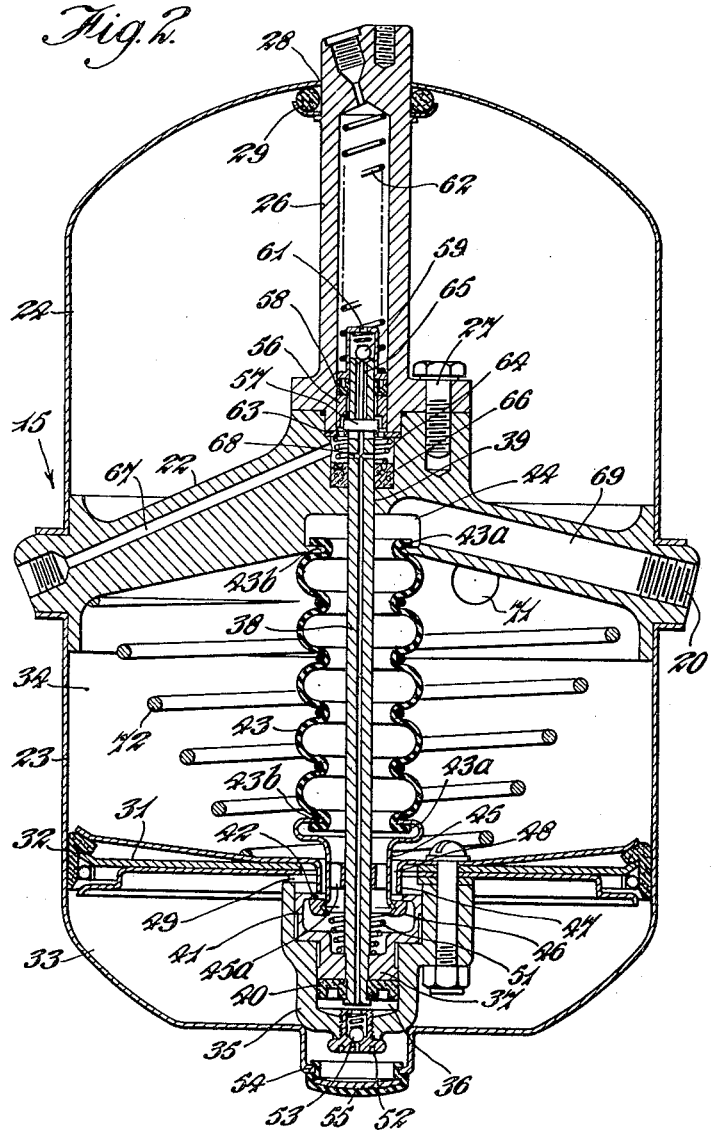

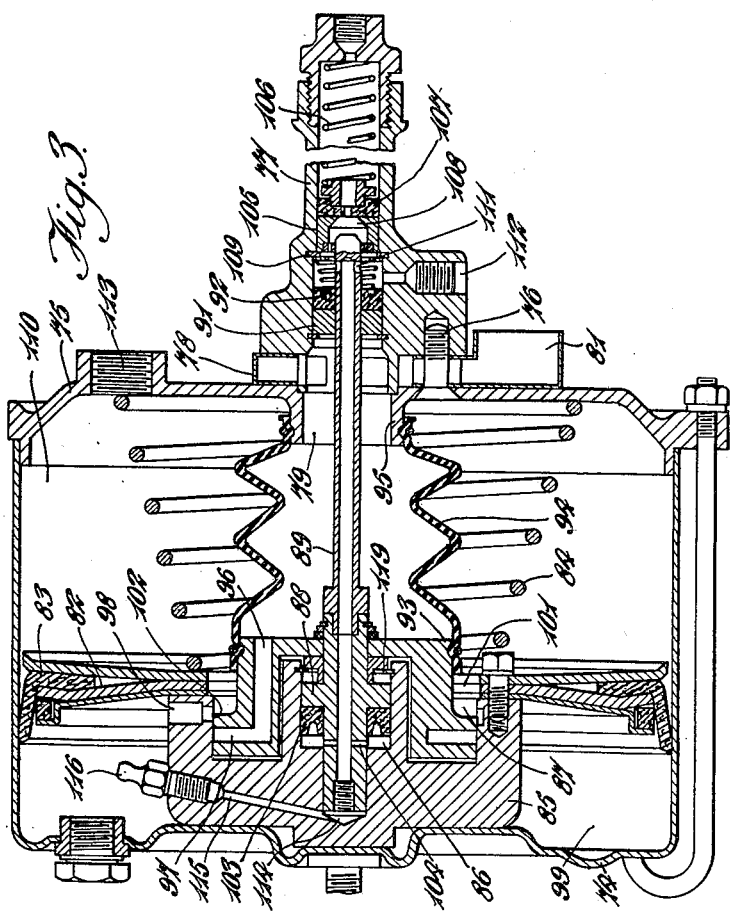

2,924,072

SERVO-ASSISTED LIQUID PRESSURE BRAKING SYSTEMS

Neil W. Burwell, Leamington Spa, England, assignor to Automotive Products Company Limited, Leamington Spa, England Application March 18, 1957, Serial No. 646,783

Claims priority, application Great Britain July 4, 1956

3 Claims. (Cl. 60—54.5)

This invention relates to servo-assisted liquid pressure braking systems of the kind comprising a primary liquid pressure master cylinder operated by a foot pedal or equivalent means, a secondary liquid pressure master cylinder operated by a fluid pressure or vacuum servo device, and motor cylinders for actuating the brakes; the operation of the primary master cylinder acting to build up pressure in the secondary master cylinder and motor cylinders and, when a certain pressure is reached, operating a valve to bring the servo device into action and isolate the secondary master cylinder and motor cylinders from the primary master cylinder, so that a reaction pressure, proportional to that produced in the secondary master cylinder by the servo device, is transmitted to the primary master cylinder.

According to this invention, in a servo assisted liquid pressure braking system comprising a primary liquid pressure master cylinder operated by a foot pedal or equivalent means, a secondary liquid pressure master cylinder, a fluid pressure or vacuum servo device, and motor cylinders for actuating brakes, the primary master cylinder being operable to transmit pressure directly to the motor cylinders and to operate a valve controlling the servo device, the servo device acts on the secondary master cylinder through a thrust-transmitting connection including a piston-and-cylinder unit connected to the primary master cylinder, and the valve controlling the servo device is operated by relative movement of the piston and cylinder of said unit so that the position of the valve is determined by the relation between the pressure produced by the primary master cylinder and the thrust exerted by the servo device.

Preferably, the servo device comprises a cylinder coaxial with the secondary master cylinder, a movable partition in the servo cylinder and a thrust rod slidably mounted in the movable partition extending into the secondary master cylinder to engage a piston therein having mounted on it the piston of the piston-and-cylinder unit and the cylinder of that unit being mounted on the movable partition.

The invention is hereinafter described with reference to the accompanying drawings, in which:

Figure 1 is diagrammatic view showing a braking system according to the invention;

Figure 2 is a sectional elevation of one form of servo device and secondary master cylinder for use in the system shown in Figure 1; and Figure 3 is a similar sectional elevation of another form of servo device and secondary master cylinder for use in the system shown in Figure 1.

Referring to Figure 1, the servo-assisted liquid pressure vehicle braking system shown therein includes the usual wheel brakes 10, of which four are shown, and motor cylinders 11 actuating the shoes or equivalent braking elements of those brakes. A primary liquid pressure master cylinder 12, operated by a foot pedal 13 in the usual manner, or by some other driver-operated member, is connected by a conduit 14 to a unit 15 comprising a servo-device and a secondary master cylinder, the details of the unit 15 being hereinafter described with reference to Figure 2. The secondary master cylinder is connected by a conduit 16 to the motor cylinders 11, and the servo device is connected by a conduit 17 to a source of suction such as the inlet manifold 18 of the vehicle engine, and by a conduit 19 to an air inlet 21.

Referring now to Figure 2, the unit 15 includes a central casting 22, comprising a rim, a central boss, and spider arms connecting the rim to the boss. To each side of the rim of the casting is secured, by any suitable means, one of two cup-shaped covers 23, 24 conveniently formed by being pressed from sheet metal. Extending axially through the space enclosed by the cover 24 is a liquid pressure master cylinder 26 constituting the secondary master cylinder of the system, the master cylinder 26 being bolted at 27 to a flat face on the boss of the casting and passing through a central aperture 28 in the end of the cover 24, a packing ring 29 being provided to make a fluid-tight joint.

A piston 31 with a peripheral packing 32 is slidable in the cover 23 and divides the space enclosed by that cover into two chambers 33 and 34. A boss 35 mounted centrally on the piston 31 projects into the chamber 33, and is formed internally with a cylinder 36 in which is slidably mounted a piston 37 fixed to a tubular rod 38 extending through a central aperture 39 in the boss of the casting 22 into the master cylinder 26. The piston 37 carries a cup packing 40. The cylinder 36 is closed at its end remote from the casting 22, and is enlarged at its other end to receive an enlarged portion 41 of the piston 37, the said enlarged portion 41 being hollow and having an internal flange 42 surrounding its open end which faces the casting 22.

A longitudinally extensible and compressible sleeve 43, having circumferential corrugations, extends between the mouth of a recess 44 in the casting 22 and a rigid sleeve 45, to the end of which is fixed an annular disc 46 lying within the enlarged portion 41 of the piston 37, the disc 46 having an external diameter larger than the internal diameter of the flange 42. The sleeve 43 is provided at its opposing ends with outwardly extending flanges 43a and inwardly directed flanges 43b, which tightly fit around the rigid sleeve 45 and the mouth of the recess 44. The sleeve and the mouth of the recess enter the grooves between the flanges 43a and the adjacent corrugations of the sleeve 43 with the flanges 43a being so shaped as to press against the flanges 43b and form a fluid tight seal. The sleeve 43 surrounds the tubular rod 38, and the rigid sleeve 45 passes through a cylindrical flange 47 surrounding a central hole 48 in the piston 31, the edge of the flange 47 projecting towards the disc 46 and that flange having a diameter smaller than the internal diameter of the flange 42. The rigid sleeve 45 is located co-axially with the rod 38 by means of a spider 45a. Radial openings 49 between the piston 31 and the boss 35 connect the interior of the boss to the chamber 33. A spring 51 urges the disc 46 into engagement with the flange 42, but this spring may be omitted.

A hollow plug 52 screwed into an aperture in the closed end of the cylinder 35, has a passage therethrough closed by a spring-loaded ball 53 which can be unseated by means of a suitable tool to allow air to be bled from the cylinder 36, the plug 52 being accessible through an aperture 54 in the end of the casing 23, which aperture is normally closed by a cap 55.

The unit 15 is preferably mounted vertically, as shown in Figures 1 and 2, with the bleeding valve 53 at its lower end. Bleeding is effected by building up pressure in the system and then opening the valve, so that liquid rushes out, carrying air with it.

The master cylinder 26 is fitted with a piston 56 upon the rear end of which the tubular rod 38 acts through a cross pin 57 extending through a slot in the said rod and engaging the rear face of the said piston. The rod 38 passes through a central aperture in the piston, with an annular cup packing 58 on the front face of the piston engaging both with the wall of the cylinder 26 and with the rod 38. A non-return ball valve 59, housed in a cage 61 held in engagement with the packing 58 by a piston return spring 62 in the master cylinder, is adapted to engage in the end of the bore of the rod 38 to prevent liquid from passing out of the master cylinder into the said bore. When the piston 56 and rod 38 are both retracted, as shown in the drawing, the pin 57 engages a washer 63 held against a shoulder in a recess 64 in the boss of the casting 22, behind the master cylinder, and is moved forwardly relative to the rod, causing a pin 65 to displace the ball valve 59 from its seat.

A cup packing 66 in the bottom of the recess 64 provides a fluid tight joint around the rod 38. A radial passage 67 in one of the spider arms of the casting 22, to which the primary master cylinder 12 is connected, leads into the recess 64, and a cross bore 68 in the rod 38 places the bore of the rod in communication with this recess. Another radial passage 69 in another of the spider arms of the casting 22 opens into the recess 44 in the disc and is connected to the air inlet 20. A radial port 71 through the rim of the casting 22 connects the chamber 34 and the space enclosed by the cover 24 to the engine manifold 18, through a non-return valve (not shown). The space enclosed by the cover 24 acts as a vacuum reservoir, thus avoiding the need for a separate reservoir. The unit may be modified by making the casting 22 as a solid disc and omitting the cover 24, a separate vacuum reservoir then being provided.

When the braking system is not being operated, the parts are in the positions shown in Figure 2. The disc 46, which co-operates with the flanges 42 and 47 to act as a control valve for the servo device, is engaged by the flange 42 and moved clear of the edge of the flange 47, so that the chamber 33 of the servo device is connected, through the openings 48 and 49, to the chamber 34, and there is no differential pressure acting on the piston 31, which is urged away from the casting 22 by a spring 72.

The non-return valve 59 is held open, so that the secondary master cylinder 26 is in free communication with the primary master cylinder 12, and through that master cylinder with a supply reservoir 73.

Actuation of the pedal 13 moves a piston in the primary master cylinder 12, the piston acting in the known manner to close the connection to the reservoir 73 and deliver liquid through the conduit 14 and passage 67 to the recess 64, from which it passes through the master cylinder 26 to the motor cylinders 11. Pressure is thus built up in the system and this pressure is transmitted to the cylinder 36. When the pressure acting in the cylinder 36 becomes sufficient to move the piston 37 and rod 38 forwardly against the resistance of the spring 62, the disc 46 moves forwardly with the piston 37 until it engages the edge of the flange 47 and so closes the opening 48, further movement of the piston causing the flange 42 thereon to move away from the disc 46 and open a connection between the air inlet 20 and the chamber 33 through the conduit 19, passage 69 and sleeve 43. A differential pressure is thus exerted on the piston 31 to move it forwardly, and thrust is transmitted from the piston 31 through the liquid in the cylinder 36 to the tubular rod 38, causing the piston 56 in the secondary master cylinder 26 to move forwardly. The cross-pin 57 being no longer supported by the washer 63, moves rearwardly relative to the rod 38, and allows the non-return valve 59 to close. A pressure higher than that produced by the primary master cylinder can thus be built up in the secondary master cylinder, depending on the thrust exerted by the servo-piston 31. This thrust, being transmitted through the liquid in the cylinder 36, tends to expel liquid from that cylinder and, for a given pressure exerted by the primary master cylinder, the thrust builds up to a value at which it expels sufficient liquid from the cylinder 36 to allow the flange 42 to re-engage the disc 46 and so prevent further increase of air pressure in the chamber 33. Thus, the thrust exerted by the servo device is at all times proportional to the pressure exerted by the primary master cylinder, the actual proportion depending on the relative areas of the piston 37 and the piston 56 in the secondary master cylinder.

The relative thrust exerted by the springs 62 and 72 is preferably such that, when the pedal 13 is released, the rod 38 tends to return more rapidly than the piston 31, so that the disc 42 is held clear of the flange 47 during the return movement of the parts, and air is able to pass freely from the chamber 33 into the chamber 34.

Figure 3 shows a modified form of servo device and secondary master cylinder unit which may be used instead of that shown in Figure 2, this unit being intended for mounting in a horizontal position. Referring to Figure 3, the unit comprises a servo-cylinder 74 closed at both ends, one end wall 75 being removable and having secured co-axially to it, for example by screws 76, the body of a secondary master cylinder 77. A hollow ring 78 mounted between the wall 75 and the master cylinder is open to a central aperture 79 in the end wall, and has an external opening 81 for connection to an air inlet. A piston 82 slidable in the servo-cylinder 74 is fitted with a peripheral packing 83 and is urged away from the end wall 75 by a spring 84. The piston 82 has secured to its central portion a boss 85 in which is formed a central cylinder 86 open at its end nearest to the wall 75, and an annular recess 87 around the cylinder 86. A piston 88 slidable in the cylinder 86 is mounted on a tubular rod 89 extending through the aperture 79 and through a partition 91 and packing 92 in the rear end of the master cylinder bore, into the said master cylinder bore. Mounted on the rod 89 is a cup-shaped valve member 93 the outer cylindrical surface of which is slidable on the outer cylindrical wall of the annular recess 87.

The valve member 93 has secured to it one end of a longitudinally extensible and contractible sleeve 94 the other end of which is secured to a cylindrical flange 95 surrounding the aperture 79, and a passage 96 in the valve member leads from the space within the sleeve 94 into a circumferential groove 97 in the valve member. One or more ports 98 is or are formed in the boss 85, extending radially from the annular recess 87 into the space 99 in the servo-cylinder 74 remote from the master cylinder 77, and relative axial movement of the valve member 93 and the boss 85 brings the ports 98 into communication with either the groove 97 or with an aperture 101 in the piston 82, a land 102 on the valve member closing the ports 98 when the said member is in an intermediate position. The piston 88 carries a packing 103, and a cross-bore 104 in the rod 89 connects the space between this packing and the closed end of the cylinder 86 with the bore of the rod 89.

The secondary master cylinder 77 has slidable therein a piston 105 acted on by a return spring 106, the piston carrying a packing 107 and having a central aperture 108. Retraction of the piston 105 is limited by a spring ring 109 mounted in the bore of the master cylinder 77, and the rod 89 is shaped at its forward end to enter and close the aperture 108 and apply a forward thrust to the piston 105. The longitudinal bore of the tubular rod 89 terminates short of its forward end, a cross bore 111 connecting the said longitudinal bore with the space in the master cylinder between the packing 92 and the piston 105. A radial port 112 in the master cylinder 77, opening into the bore just in front of the packing 92, is connected to the primary master cylinder, and a port 113 in the wall 75 of the servo-cylinder, leading into the space 110 therein in front of the piston 82, is connected to the inlet manifold of the vehicle engine.

The rod 89 extends through the cylinder 86 into a bore 114 in the boss 85, the longitudinal bore of the rod opening into the bore 114, which communicates by a passage 115 with an opening controlled by a screw plug 116 to enable air to be bled from the cylinder 86.

In the illustrated position of the parts, when the system is not being operated, both the servo piston 82 and the piston 105 of the secondary master cylinder are urged rearwardly by their return springs, against the end wall of the servo-cylinder and the spring ring 109 respectively, and the rod 89 is also urged rearwardly, by the resilience and air pressure of the sleeve 94, its rearward movement being limited by a spring ring 119 in the cylinder 86. This spring ring 119 locates the rod 89 in such a position that the two spaces 99 and 110 in the servo-cylinder 74 are connected one to the other through the aperture 101 and port 98, and the aperture 108 in the piston 105 of the secondary master cylinder is open. Since the space 110 in the servo-cylinder 74 in front of the piston 82 is connected to the inlet manifold of the engine of the vehicle on which the braking system is mounted, both spaces in the servo-cylinder are exhausted.

When the pedal-operated master cylinder is actuated pressure is built up in the whole liquid system until, acting on the piston 88, it moves the latter forwardly relative to the servo piston 82, thus operating the valve member 93 to shut off the connection between the front and rear spaces in the servo-cylinder and to connect the rear space 99 to the atmosphere through the ring 78, sleeve 94, passage 96, groove 97 and port 98. The servo piston 82 is then urged forwardly by the atmospheric pressure acting on its rear face, causing the front end of the rod 89 to close the aperture 108 in the piston 105 of the secondary master cylinder and force that piston forwardly. Thus, a higher pressure is built up in the secondary master cylinder and motor cylinders due to the thrust exerted by the servo-device. When this thrust reaches a value at which it overcomes the thrust exerted between the servo piston 82 and the rod 89 by the pressure due to the operation of the primary master cylinder, the servo piston 82 moves forwardly relative to the rod 89, operating the valve member 93 to shut off the rear chamber 99 of the servo-cylinder from the atmosphere by bringing the land 102 on the valve member 93 opposite to the port 98. Thus, the exertion of any given pressure on the pedal produces a higher proportionate pressure in the secondary master cylinder. A reduction of the pedal pressure causes the valve member 93 to move to a position in which the rear chamber 99 of the servo-cylinder is connected to the front chamber, and thus reduces the pressure in the secondary master cylinder.

It will be understood that this invention is not limited to the particular forms of servo-device described, but may be applied to any form of fluid pressure servo-device associated with a liquid pressure braking system of the kind set forth in the opening paragraph of this specification. In particular, the servo-device can be modified for use with air under pressure by connecting the port 71 (Figure 2) or 113 (Figure 3) to the atmosphere, and connecting the passage 69 (Figure 2) or the air inlet 81 (Figure 3) to a source of compressed air.

I claim:

1. A servo-assisted pressure braking means for a hydraulic brake system comprising a primary master cylinder, operating means for such cylinder, a vacuum type servo unit including a servo-cylinder having first and second end walls and a servo piston dividing the servo-cylinder into first and second chambers each bounded by one of said end walls, a secondary master cylinder mounted co-axially on the first end wall of said servo-cylinder and having a piston working therein, suction-producing means permanently connected to the first chamber in said servo-cylinder between the servo piston and the said first end wall thereof, a longitudinally extensible and compressible sleeve mounted in said first chamber and extending co-axially between said first end wall and said servo piston, air inlet means connected to the end of said sleeve at said first end wall, valve means in said servo piston operative to connect the second chamber in said servo-cylinder selectively to said sleeve and to said first chamber, a hydraulic cylinder mounted on said servo piston, a thrust rod having an axial bore therethrough connecting said hydraulic cylinder to the secondary master cylinder, said thrust rod being operatively connected to the secondary master cylinder piston, a piston on said thrust rod slidable in said hydraulic cylinder, conduit means connecting said hydraulic cylinder to the primary master cylinder, and a valve operative on the application of thrust to the thrust rod to close said axial bore, said valve means being operated by movement of the piston on the thrust rod in said hydraulic cylinder.

2. A servo assisted pressure braking system according to claim 1, wherein said valve means comprises a rigid sleeve mounted on the end of said longitudinally extensible and compressible sleeve adjacent said servo piston, an annular disc mounted on said sleeve and extending radially outwardly therefrom, a cylindrical flange on said servo piston and surrounding an opening therein, said rigid sleeve extending through said opening, an axial cavity in the piston on said thrust rod, and an internal flange defining the mouth of said cavity, said flange overlapping said disc, and spring means urging said flange towards said disc, so that thrust applied to said thrust rod moves said internal flange past the end of said cylindrical flange with said disc being thereby brought into abutment with said cylindrical flange and separated from said disc.

3. A servo assisted pressure braking system according to claim 1, and including a casing fixed to the said first end wall of the servo cylinder, said secondary master cylinder projecting through said casing, packing means making a fluid-tight joint between said casing and said secondary master cylinder, and passage means connecting the interior of said casing to the chamber in said servo cylinder between said servo piston and said first end wall.

References Cited in the file of this patent

UNITED STATES PATENTS

| | | |
|---|---|---|
| 2,365,471 | Ingres | Dec. 19, 1944 |
| 2,411,458 | Penrose | Nov. 19, 1946 |
| 2,438,723 | Stelzer | Mar. 30, 1948 |
| 2,847,828 | Porter | Aug. 19, 1958 |